United States Patent Office 2,779,758
Patented Jan. 29, 1957

2,779,758
CHROMABLE DISAZO DYESTUFFS

Reinhard Neier, Basel, and Charles Petitjean and Walter Wehrli, Riehen, Switzerland, assignors, by mesne assignments, to Saul & Co., Newark, N. J., as nominee of Fidelity Union Trust Company No Drawing. Application August 12, 1952, Serial No. 304,012

Claims priority, application Switzerland September 4, 1951

9 Claims. (Cl. 260—190)

The present invention relates to chromable disazo dyestuffs.

A primary object of the invention is the embodiment of disazo dyestuffs, especially suitable for use by the after-chroming and/or so-called metachrome process and yielding dyeings, particularly on wool, of excellent light-fastness and wet-fastness properties.

This object is realized by the provision, according to the present invention, of the disazo dyestuffs of the formula

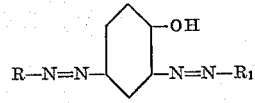

wherein R stands for the radical of a diazo component of the benzene or naphthalene series which, if desired, may be substituted by a wide variety of substituents, and $R_1$ stands for the radical of any azo component, other than 1,3-dihydroxybenzene, which contains a hydroxyl group in ortho-position to the azo group and which may contain a wide variety of other substituents.

The aforesaid disazo dyestuffs of the present invention may be prepared by coupling 1 mol of the diazo compound of a monoazo dyestuff of the formula

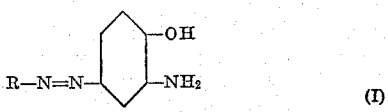

wherein R has the precedingly-recited significance, with 1 mol of any desired azo component, with the exception of 1,3-dihydroxybenzene, provided that such azo component carries an OH group and couples in ortho-position to the OH group, and provided also that the components are so selected that the resultant disazo dyestuff will contain at least one water-solubilizing group. For the rest, the azo component may be further substituted as desired.

An alternative method of preparing the disazo dyestuffs of the present invention is by coupling 1 mol of the diazo compound of an amine of the benzene or naphthalene series, which amine may be substituted in any desired manner, with 1 mol of a monoazo dyestuff of the formula

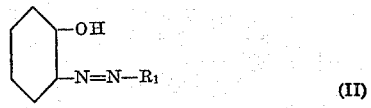

wherein $R_1$ has the hereinbefore-recited significance, the components again being so selected that the formed disazo dyestuff will contain at least one water-solubilizing group.

The monoazo dyestuffs of Formula I, which serve as starting materials for the first-described method of preparing the disazo dyestuffs of this invention, can be prepared for example by coupling a diazotized amine of the benzene or naphthalene series, which may contain desired substituents, with a 1-hydroxy-2-N-acylaminobenzene, and then converting the acylamino group of the coupling product into the amino group by saponification.

Suitable 1-hydroxy-2-acylaminobenzenes, for the purposes of the preceding paragraph, comprise for example the following:

1-hydroxy-2-N-acetylaminobenzene,
1-hydroxy-2-N-formylaminobenzene,
1-hydroxy-2-N-propionylaminobenzene,
1-hydroxy-2-N-oxalylaminobenzene,
1-hydroxy-2-N-benzoylaminobenzene,
1-hydroxy-2-N-carbomethoxyaminobenzene,
1-hydroxy-2-N-carbethoxyaminobenzene, etc.

The monoazo dyestuffs of Formula I are also obtained when, in dyestuffs corresponding to the formula

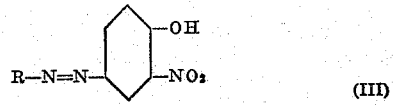

wherein R has the previously-recited significance, the nitro group is reduced to the amino group. The nitro derivatives themselves can be prepared according to known methods, on the one hand by nitration of the corresponding 4-hydroxyazobenzene, obtained by coupling the appropriate diazotized amines of the benzene and naphthalene series with hydroxybenzene, or on the other hand by coupling the appropriate diazotized amines of the benzene and naphthalene series with 1-hydroxy-2-nitrobenzene.

Amines of the benzene and napthalene series which are suitable for coupling with 1-hydroxy-2-N-acylaminobenzenes or 1-hydroxy-2-nitrobenzene or hydroxybenzene comprise, among others:

Aminobenzene,
1-amino-2-methylbenzene,
1-amino-3-methylbenzene,
1-amino-4-methylbenzene,
1-amino-2-ethylbenzene,
1-amino-3-ethylbenzene,
1-amino-4-ethylbenzene,
1-amino-2,4-dimethylbenzene,
1-amino-2,5-dimethylbenzene,
1-amino-2,6-dimethylbenzene,
1-amino-2,4-diethylbenzene,
1-amino-2,5-diethylbenzene,
1-amino-2,6-diethylbenzene,
1-amino-2,4,6-trimethylbenzene,
1-amino-2,4,6-triethylbenzene,
1-amino-2-methoxybenzene,
1-amino-3-methoxybenzene,
1-amino-4-methoxybenzene,
1-amino-2-chlorobenzene,
1-amino-3-chlorobenzene,
1-amino-4-chlorobenzene,
1-amino-2-nitrobenzene,
1-amino-3-nitrobenzene,
1-amino-4-nitrobenzene, 1-aminobenzene-2-sulfonic acid,
1-aminobenzene-3-sulfonic acid,
1-aminobenzene-4-sulfonic acid,
1-amino-2-methylbenzene-4-sulfonic acid,
1-amino-2-methylbenzene-5-sulfonic acid,
1-amino-2,4-dimethylbenzene-6-sulfonic acid,
1-amino-2,5-dichlorobenzene-4-sulfonic acid,
1-aminobenzene-2-carboxylic acid,
1-aminobenzene-3-carboxylic acid,
1-aminobenzene-4-carboxylic acid,
1-amino-4-hydroxybenzene-3-carboxylic acid,
1-amino-3-hydroxy-4-carboxybenzene-5-sulfonic acid,
1-aminonaphthalene,
2-aminonaphthalene,
1-aminonaphthalene-2-sulfonic acid,
1-aminonaphthalene-4-sulfonic acid,
1-aminonaphthalene-5-sulfonic acid,
1-aminonaphthalene-6-sulfonic acid,
1-aminonaphthalene-7-sulfonic acid,
1-aminonaphthalene-8-sulfonic acid,
2-aminonaphthalene-1-sulfonic acid,
2-aminonaphthalene-5-sulfonic acid,
2-aminonaphthalene-6-sulfonic acid,
2-aminonaphthalene-7-sulfonic acid,
2-aminonaphthalene-8-sulfonic acid, etc.

As azo components which couple in ortho-position to the hydroxy group and which may contain other substituents in addition to a hydroxy group, use may be made of all oxyaryls, with the exception of 1,3-dihydroxybenzene, which are capable of forming ortho, ortho'-dihydroxyazo dyestuffs, and also of compounds with methylene groups which are capable of coupling, as for example 2-hydroxynaphthalene, 2-hydroxy-6-tert.-amylnaphthalene, 1 - N - acetylamino - 7 - hydroxynaphthalene, 1 - N - carbethoxyamino - 7 - hydroxynaphthalene, 2-hydroxynaphthalene-4- or -6- or -7- or -8- sulfonic acid, 1-hydroxy-5,8-dichloronaphthalene, 1-hydroxy4-benzoylnaphthalene, 1-hydroxynaphthalene-4- or -5-sulfonic acid, 2-hydroxynaphthalene-3- or -6-carboxylic acid, 2-hydroxynaphthalene-3- or -6-carboxylic acid, 2 - hydroxynaphthalene - 3 - carboxylic acid - N - phenylamide, as well as all aminohydroxynaphthalenesulfonic acids which couple in ortho-position to the hydroxy group and which may be alkylated, arylated or acylated in the amino group, also the 5-pyrazolones such as 3-methyl - 5 - pyrazolone and 1 - phenyl - 3 - methyl - 5- pyrazolone, 1 - phenyl - 5 - pyrazolone - 3 - carboxylic acid, 1 - phenyl - 5 - pyrazolone - 3 - carboxylic acid amide, the aryl nucleus of which may carry any desired substituents such as chlorine atoms, and nitro, alkyl, carboxy or sulfonic acid groups.

The monoazo dyestuffs of Formula II, which are used as starting materials in the alternative method of preparing the disazo dyestuffs of this invention, are obtained by coupling the diazo compound of 1-hydroxy-2-aminobenzene with an azo component, other than 1,3-dihydroxybenzene, which couples in ortho-position to the hydroxy group and which, in addition to the latter, may contain other substituents. For example, all the other hereinbefore-enumerated azo components may be used. Of the amines of the benzene and naphthalene series, the diazo compounds of which are coupled with the monoazo dyestuff of Formula II, all the amines enumerated in connection with the first-described method of preparation of the disazo dyestuffs of this invention, are suitable.

The new dyestuffs which correspond to the formula

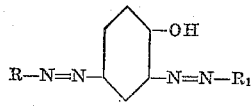

wherein R and $R_1$ have the previously-given significances, dye wool, by the afterchroming method, in yellow-brown, red, red-brown, brown, gray-brown, olive-green and green shades of excellent fastness to light and very good wet-fastness properties. Many of the dyestuffs are also suitable for use according to the metachrome process.

The following examples are illustrative of some presently preferred representative embodiments of the invention. The parts are by weight. Temperatures are in degrees centigrade.

*Example 1*

29.3 parts of the monoazo dyestuff, obtained by coupling diazotized 1-aminobenzene-4-sulfonic acid with 1-hydroxy - 2 - N - acetylaminobenzene and saponification of the acetylamino group to the amino group, are dissolved in 300 parts of water and 4 parts of sodium hydroxide, then 6.9 parts of sodium nitrite are added, and the mixture added dropwise to a mixture of 36 parts of concentrated hydrochloric acid and 100 parts of water. The thus - obtained diazo compound is introduced, while cooling with ice, into a solution of 14.4 parts of 2-hydroxynaphthalene and 14 parts of sodium hydroxide in 150 parts of water. As soon as the ensuing coupling is concluded, the resultant dyestuff is salted out with sodium chloride, and then filtered off and dried.

The dyestuff, which corresponds to the formula

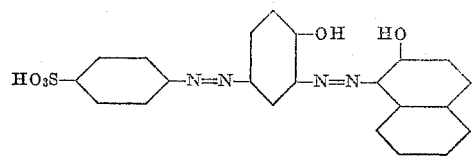

is a dark powder which dissolves with violet coloration in dilute sodium carbonate solution and with green coloration in concentrated sulfuric acid, and dyes wool—by the afterchroming and metachrome processes—in grayish brown shades. The dyeings are characterized by excellent fastness to light and very good wet-fastness properties.

A similar dyestuff is obtained when, while otherwise proceeding as aforedescribed in the present invention, the recited monoazo dyestuff used to prepare the diazo compound is replaced by an equivalent amount of the monoazo dyestuff prepared by coupling diazotized 1-aminobenzene-3-sulfonic acid or diazotized 1-amino-2-methylbenzene - 4 - sulfonic acid or diazotized 1 - amino- 2 - methylbenzene - 5 - sulfonic acid or diazotized 1-amino - 2,4 - dimethylbenzene - 5 - sulfonic acid or diazotized 1 - amino - 2,4 - dimethylbenzene - 6 - sulfonic acid or diazotized 1 - amino - 2 - methyl - 6 - chlorobenzene - 4 - sulfonic acid or diazotized 1 - amino - 2- methyl - 3 - chlorobenzene - 5 - sulfonic acid with 1 - hydroxy - 2 - N - acetylaminobenzene, followed by saponification.

A similar dyestuff is also obtained when, under the indicated circumstances, the azo component, 2-hydroxynaphthalene, is replaced by an equivalent quantity of 2 - hydroxy - 6 - tert. - amylnaphthalene or by 2 - hydroxynaphthalene - 3 - carboxylic acid - N - phenylamide.

*Example 2*

34.3 parts of the monoazo dyestuff, obtained by coupling diazotized 1-amino-naphthalene-5-sulfonic acid with 1-hydroxy-2-N-acetylaminobenzene and saponification of the acetylamino group to the amino group, are dissolved in 400 parts of water and 4 parts of sodium hydroxide, 6.9 parts of sodium nitrite added to the solution, and the mixture added dropwise to a mixture of 36 parts of concentrated hydrochloric acid and 100 parts of ice-water. The thus-obtained diazo compound is introduced, while cooling with ice, into a solution of 14.4 parts of 2-hydroxynaphthalene and 14 parts of sodium hydroxide in 150 parts of water. As soon as the resultant disazo dyestuff formation is finished, such disazo dyestuff is salted out with sodium chloride, and the precipitated dyestuff is then filtered off and dried.

The dyestuff, which corresponds to the formula

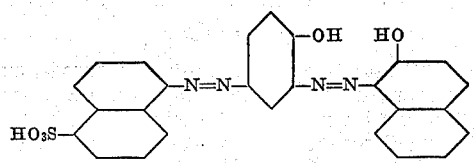

is a dark powder which dissolves with violet coloration in dilute sodium carbonate solution and with blue coloration in concentrated sulfuric acid, and dyes wool—by the afterchroming and metachrome processes—in grayish brown shades. The dyeings are characterized by excellent fastness to light and very good wet-fastness properties.

When, while otherwise proceeding as aforedescribed in the present example, the initially-mentioned monoazo dyestuff is replaced by an equivalent amount of monoazo dyestuff prepared by coupling diazotized 1-aminonaphthalene-6-sulfonic acid or diazotized 1-aminonaphthalene-7-sulfonic acid or diazotized 2-aminonaphthalene-6-sulfonic acid or diazotized 2-aminonaphthalene-7-sulfonic acid or diazotized 2 - aminonaphthalene - 8 - sulfonic acid with 1-hydroxy-2-N-acetylaminobenzene, followed by saponification, and/or the azo component, 2-hydroxynaphthalene, is replaced by an equivalent quantity of 1-hydroxy-5,8-dichloronaphthalene or 1-hydroxy-4-benzoylnaphthalene or 2-hydroxynaphthalene-6-sulfonic acid or 2-hydroxynaphthalene-7-sulfonic acid or 1-hydroxynaphthalene-4-sulfonic acid, similar dyestuffs are obtained.

Example 3

26.3 parts of the monoazo dyestuff, obtained by coupling diazotized 1-aminonaphthalene with 1-hydroxy-2-nitrobenzene followed by reduction of the nitro group to the amino group, are dissolved in 300 parts of water and 4 parts of sodium hydroxide, 6.9 parts of sodium nitrite are added to the solution, and the resultant mixture then added dropwise at 0–10° to a mixture of 36 parts of concentrated hydrochloric acid and 100 parts of water. The resultant precipitated diazo compound is isolated and then introduced, while cooling with ice, into a solution of 22.4 parts of 2-hydroxynaphthalene-6-sulfonic acid and 4 parts of sodium hydroxide in 150 parts of water and 20 parts of pyridine. As soon as the ensuing disazo dyestuff formation is over, the said disazo dyestuff is isolated and dried.

The disazo dyestuff, which corresponds to the formula

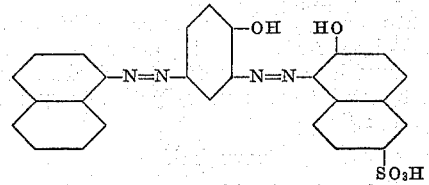

is a dark powder which dissolves with violet coloration in dilute sodium carbonate solution and with blue coloration in concentrated sulfuric acid, and dyes wool—by the afterchroming and metachrome processes—in grayish brown shades. The dyeings are characterized by good fastness to light and excellent wet-fastness properties.

Similar dyestuffs are obtained when, while otherwise proceeding as aforedescribed in the present example, the azo component—2-hydroxynaphthalene-6-sulfonic acid—is replaced by an equivalent quantity of 2-hydroxynaphthalene-7-sulfonic acid or 1-hydroxynaphthalene-4-sulfonic acid.

Example 4

21.3 parts of the monoazo dyestuff, obtained by coupling diazotized aminobenzene with hydroxybenzene followed by nitration and reduction of the nitro group to the amino group, are dissolved in 200 parts of water and 4 parts of sodium hydroxide, 6.9 parts of sodium nitrite added to the solution, and the resultant mixture added at 0–10° to a mixture of 36 parts of concentrated hydrochloric acid and 100 parts of ice-water. The resultant diazo compound is isolated and then added, while cooling with ice, to a solution of 31.5 parts of 2-N-phenylamino-8-hydroxynaphthalene-6-sulfonic acid and 4 parts of sodium hydroxide in 200 parts of water and 20 parts of pyridine. As soon as the ensuing disazo dyestuff formation is finished, the disazo dyestuff is isolated and dried.

The disazo dyestuff, thus prepared, corresponds to the formula

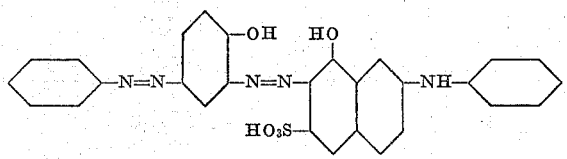

and is a dark powder which dissolves with green-blue coloration in dilute sodium carbonate solution and with red coloration in concentrated sulfuric acid, and dyes wool—by the afterchroming and metachrome processes—in olive-gray shades. The dyeings are characterized by excellent light fastness and very good wet-fastness properties.

Similar products, dyeing wool in gray shades by the afterchroming process, are obtained when, while otherwise proceeding as aforedescribed in the present example, the azo-component-2-N-phenylamino-8-hydroxynaphthalene-6-sulfonic acid—is replaced by an equivalent quantity of 2 - N - benzoylamino-5-hydroxynaphthalene-7-sulfonic acid or of 2-hydroxynaphthalene-4-sulfonic acid. If 1-hydroxynaphthalene-4-sulfonic acid or 2-hydroxynaphthalene-6-sulfonic acid or 2-hydroxynaphthalene-7-sulfonic acid are used as azo components, dyestuffs are obtained which dye wool in gray-brown shades by the afterchroming process and which, moreover, are also suitable for dyeing according to the metachrome process.

Example 5

26.3 parts of the aminoazo dyestuff, obtained by coupling diazotized 2-aminonaphthalene with 1-hydroxy-2-N-carbethoxyaminobenzene followed by saponification of the carbethoxyamino group to the amino group, are dissolved in 400 parts of water and 4 parts of sodium hydroxide, 6.9 parts of sodium nitrite added to the solution, and the resultant mixture then added dropwise at 0–10° to a mixture of 36 parts of concentrated hydrochloric acid and 100 parts of ice-water. The thus-produced diazo compound is isolated and introduced into a solution of 22.4 parts of 1-hydroxynaphthalene-4-sulfonic acid and 4 parts of sodium hydroxide in 150 parts of water and 20 parts of pyridine. As soon as the ensuing disazo dyestuff formation is complete, the said dyestuff is isolated and dried.

The thus-produced disazo dyestuff, which corresponds to the formula

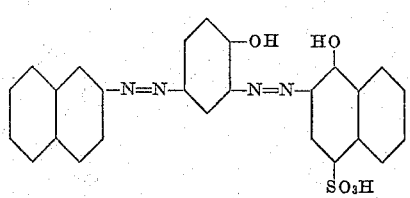

is a dark powder which dissolves with red-violet coloration in dilute sodium carbonate solution and with blue-violet coloration in concentrated sulfuric acid, and dyes wool—by the afterchroming and metachrome processes—in brown shades. The dyeings are characterized by excellent light fastness and very good wet-fastness properties.

Example 6

25.9 parts of the monoazo dyestuff, prepared by coupling diazotized 1-amino-4-hydroxybenzene-3-carboxylic acid with 1-hydroxy-2-N-propionylaminobenzene followed by saponification of the propionylamino group to the amino group, are dissolved in 250 parts of water and 4 parts of sodium hydroxide, 6.9 parts of sodium nitrite added to the solution, and the resultant mixture poured at 0–10° into a mixture of 36 parts of concentrated hydrochloric acid and 100 parts of ice-water. The suspension of the diazo compound is introduced, while cooling with ice, into a solution of 20.1 parts of 1-N-acetylamino-7-hydroxynaphthalene and 14 parts of sodium hydroxide in 150 parts of water. As soon as the resultant disazo dyestuff formation has been completed, the formed disazo dyestuff is salted out with sodium chloride, and the precipitated dyestuff filtered off and dried.

The disazo dyestuff, which corresponds to the formula

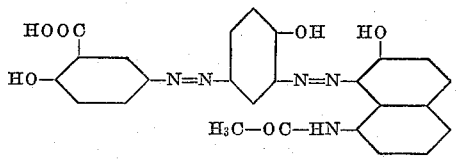

is a dark powder which dissolves with green coloration in dilute sodium carbonate solution and with violet coloration in concentrated sulfuric acid, and dyes wool—by the afterchroming and metachrome processes—in olive-green shades. The dyeings are characterized by an excellent light fastness and very good wet-fastness properties.

Similar dyestuffs are obtained when, while otherwise proceeding as described in the present example, the azo component — 1-N-acetylamino-7-hydroxynaphthalene — is replaced by an equivalent quantity of 1-N-carbethoxyamino-7-hydroxynaphthalene or 1-N-carbo-(2-ethoxy)-ethoxy-amino-7-hydroxynaphthalene or 1-N-carbomethoxy-amino-7-hydroxynaphthalene.

Example 7

29.3 parts of the monoazo dyestuff, prepared by coupling 1-aminobenzene-4-sulfonic acid with 1-hydroxy-2-N-benzoylaminobenzene followed by saponification of the benzoylamino group to the amino group, are dissolved in 200 parts of water and 4 parts of sodium hydroxide, 6.9 parts of sodium nitrite added to the solution, and the resultant mixture poured into a mixture of 30 parts of concentrated hydrochloric acid and 100 parts of ice-water. The thus-obtained diazo suspension is then added, while cooling with ice, to a solution of 17.4 parts of 1-phenyl-3-methyl-5-pyrazolone and 12 parts of sodium hydroxide in 150 parts of water. Upon completion of the ensuing disazo dyestuff formation, the said dyestuff is salted out with sodium chloride, and the precipitated dyestuff is filtered off and dried.

The thus-obtained disazo dyestuff, which corresponds to the formula

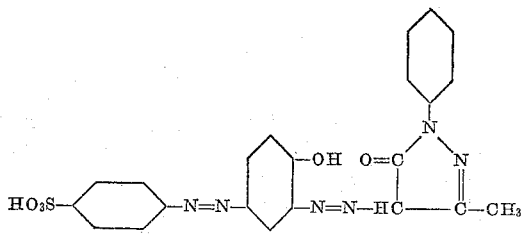

is a brown powder which dissolves with orange-red coloration in dilute sodium carbonate solution and in concentrated sulfuric acid, and dyes wool by the afterchroming process in red shades. The dyeings are characterized by excellent fast to light and by very good wet-fastness properties.

Similar dyestuffs are obtained when, while otherwise proceeding as aforedescribed in the present example, the azo component—1-phenyl-3-methyl-5-pyrazolone—is replaced by an equivalent quantity of 3-methyl-5-pyrazolone or 1-(3'-chlorophenyl)-3-methyl-5-pyrazolone or 1-(4'-sulfophenyl)-3-methyl-5-pyrazolone or 1-phenyl-5-pyrazolone-3-carboxylic acid amide or 1-(3'-sulfamidophenyl)-3-methyl-5-pyrazolone or of barbituric acid.

Example 8

An aqueous solution of 13.8 parts of diazotized 1-amino-4-nitrobenzene is poured into a solution, in 200 parts of ice-water, of 34 parts of the monoazo dyestuff obtained by coupling diazotized 1-hydroxy-2-aminobenzene with 2-hydroxynaphthalene-6-sulfonic acid, said last-named solution also containing 10 parts of sodium hydroxide. Upon completion of the ensuing disazo dyestuff formation, the said dyestuff is salted out with sodium chloride, filtered off and dried.

The thus-obtained disazo dyestuff, which corresponds to the formula

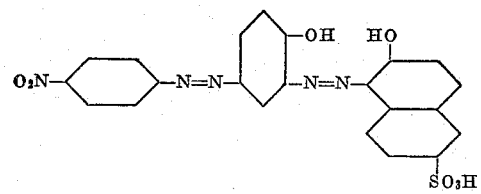

is a dark powder which dissolves with violet coloration in dilute sodium carbonate solution and with greenish blue coloration in concentrated sulfuric acid and dyes wool—by the afterchroming and metachrome processes—in brown shades. The dyeings are characterized by excellent light fastness and wet-fastness properties.

Example 9

The procedure described in Example 2 (first two paragraphs) is followed except that the monoazo dyestuff used to prepare the diazo compound is replaced by an equivalent quantity of the monoazo dyestuff obtained by coupling diazotized 1-aminonaphthalene-4-sulfonic acid with 1-hydroxy-2-N-acetylaminobenzene followed by saponification of the acetylamino group to the amino group. The thus-obtained dyestuff corresponds to the formula

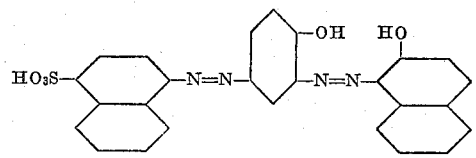

and in the dry state is a dark powder which dissolves with violet coloration in dilute sodium carbonate solution and with blue coloration in concentrated sulfuric acid and dyes wool—by the afterchroming and metachrome processes—in grayish brown shades. The dyeings are characterized by excellent fastness to light and very good wet-fastness properties.

Example 10

The procedure described in Example 2 (first two paragraphs) is followed except that the monoazo dyestuff used to prepare the diazo compound is replaced by an equivalent quantity of the monoazo dyestuff obtained by coupling diazotized 2-aminonaphthalene-5-sulfonic acid with 1-hydroxy-2-N-acetylaminobenzene followed by saponification of the acetylamino group to the amino group. The thus-obtained disazo dyestuff corresponds to the formula

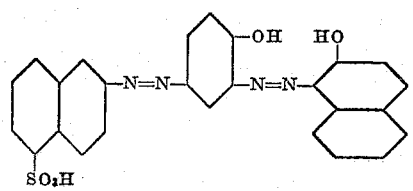

and dissolves with violet coloration in dilute sodium carbonate solution and with blue coloration in concentrated sulfuric acid and dyes wool—by the afterchroming and metachrome processes—in grayish brown shades of excellent fastness to light and very good wet-fastness properties.

*Example 11*

0.5 part of the dyestuff of Example 1 (first two paragraphs) is dissolved in 2000 parts of water, 5 parts of sodium sulfate and 1 part of acetic acid are added. 50 parts of wool are introduced at 40° into the thus-prepared bath, the temperature of which is raised in the course of 30 minutes to the boiling temperature, the material being frequently moved around therein. After a boiling period of 30 minutes, the evaporated water is replaced and 1 part of formic acid added. The bath is then again boiled for 30 minutes, the evaporated water replaced, 0.5 part of sodium bichromate added, and the bath maintained at 95–100° for a period of 30 minutes, the material being repeatedly moved around. Thereupon the material is removed from the bath, thoroughly rinsed in cold water, and dried. It is dyed grayish brown.

*Example 12*

0.5 part of the dyestuff of Example 1 (first two paragraphs) is dissolved in 2000 parts of water, 5 parts of sodium sulfate and 0.5 part of ammonium chromate added. 50 parts of wool are introduced at 40° into the thus-prepared bath, the temperature of which is then raised to 100° while frequently moving the material around therein. After a boiling period of 90 minutes, the dyestuff will have been completely exhausted onto the wool; the dyed material is then rinsed with cold water and then dried. The wool is dried in grayish brown shades.

Having thus disclosed the invention what is claimed is:

1. A disazo dyestuff which corresponds to the formula $$\left[ R-N=N-\underset{\underset{R_1}{|}}{\bigcirc}\!\!\!\!-OH\atop -azo-R_1 \right]-x_n$$

wherein R stands for a diazo component selected from the group consisting of radicals of the benzene and naphthalene series $$\underset{R_1}{\overset{OH}{|}}$$

stands for a coupling component selected from the group consisting of radicals of the hydroxynaphthalene and pyrazolone series and of barbituric acid, the OH group of $$\underset{R_1}{\overset{OH}{|}}$$

being in ortho-position to -azo-, $x$ stands for a water-solubilizing group selected from the group consisting of the carboxyl and sulfonic acid groups, and wherein $n$ is one of the integers 1 and 2.

2. A disazo dyestuff which corresponds to the formula $$R_2-N=N-\underset{}{\bigcirc}\!\!-OH\,y\atop -azo-\bigcirc\!\!-z$$

wherein $$\underset{R_1}{\overset{z}{|}}$$

stands for a radical of the benzene series, $y$ stands for a hydroxyl group in ortho-position to -azo-, one $z$ stands for a sulfonic acid group and the other $z$ stands for a hydrogen atom.

3. A disazo dyestuff which corresponds to the formula $$R_2-N=N-\underset{}{\bigcirc}\!\!-OH\,y\atop -azo-\bigcirc\!\!-z$$

wherein $$\underset{R_2}{\overset{z}{|}}$$

stands for a radical of the naphthalene series, $y$ stands for a hydroxyl group in ortho-position to -azo-, one $z$ stands for a sulfonic acid group and the other $z$ stands for a hydrogen atom.

4. The disazo dyestuff which corresponds to the formula $$HO_3S-\bigcirc-N=N-\bigcirc(OH)-N=N-\bigcirc(HO)$$

5. The disazo dyestuff which corresponds to the formula $$HO_3S-\bigcirc-N=N-\bigcirc(OH)-N=N-\bigcirc(HO)$$

6. The disazo dyestuff which corresponds to the formula $$\bigcirc-N=N-\bigcirc(OH)-N=N-\bigcirc(HO)-SO_3H$$

7. The disazo dyestuff which corresponds to the formula $$HO_3S-\bigcirc-N=N-\bigcirc(OH)-N=N-\bigcirc(HO)$$

8. The disazo dyestuff which corresponds to the formula $$\bigcirc-N=N-\bigcirc(OH)-N=N-\bigcirc(HO)\atop SO_3H$$

9. The disazo dyestuff which corresponds to the formula
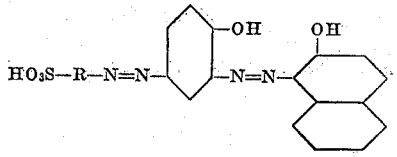
wherein R stands for a diazo component selected from the group consisting of the benzene and naphthalene series.
References Cited in the file of this patent
UNITED STATES PATENTS
| | | |
|---|---|---|
| 1,847,022 | Schmid et al. | Feb. 23, 1932 |
| 2,150,380 | Knight | Mar. 14, 1939 |
| 2,446,662 | Nies | Aug. 10, 1948 |
| 2,735,844 | Neier et al. | Feb. 21, 1956 |